US006995706B2

(12) United States Patent
Ohlsson

(10) Patent No.: US 6,995,706 B2
(45) Date of Patent: Feb. 7, 2006

(54) METHOD AND AN ARRANGEMENT IN A RADAR LEVEL GAUGING SYSTEM

(75) Inventor: Magnus Ohlsson, Norsholm (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 10/777,765

(22) Filed: Feb. 13, 2004

(65) Prior Publication Data

US 2005/0179584 A1    Aug. 18, 2005

(51) Int. Cl.
*G01F 23/284* (2006.01)
*G01S 13/08* (2006.01)

(52) U.S. Cl. .................... 342/124; 342/82; 342/89; 342/118; 342/134; 342/159; 342/175; 342/195

(58) Field of Classification Search ............... 342/59, 342/82–103, 118, 124, 128–145, 159, 175, 342/188–197; 73/304 R, 304 C
See application file for complete search history.

(56) References Cited

U.S. PATENT DOCUMENTS

| | | | | | |
|---|---|---|---|---|---|
| 5,136,299 | A | * | 8/1992 | Edvardsson | 342/124 |
| 5,233,352 | A | * | 8/1993 | Cournane | 342/124 |
| 5,420,591 | A | * | 5/1995 | Annee et al. | 342/188 |
| 5,734,346 | A | * | 3/1998 | Richardson et al. | 342/124 |
| 6,414,627 | B1 | * | 7/2002 | McEwan | 342/134 |
| 6,759,976 | B1 | * | 7/2004 | Edvardsson | 342/124 |
| 6,759,977 | B1 | * | 7/2004 | Edvardsson et al. | 342/124 |

* cited by examiner

*Primary Examiner*—Bernarr E. Gregory
(74) *Attorney, Agent, or Firm*—Westman, Champlin & Kelly, P.A.

(57) ABSTRACT

A method, an arrangement and a radar level gauging system for preventing interference, which radar level gauging system comprises at least two radar level gauges arranged to measure a filling level of a product kept in a container. Microwave pulses are transmitted towards the surface of said product and microwave pulses reflected by said surface are received by said at least two radar level gauges. Information is provided with said microwave pulses and said information is used for controlling the measurement pulses of said at least two radar level gauges.

22 Claims, 2 Drawing Sheets

METHOD AND AN ARRANGEMENT IN A RADAR LEVEL GAUGING SYSTEM

BACKGROUND OF THE INVENTION

1. Field of the Invention

The present patent application relates to the field of radar gauges in radar level gauging systems, and particularly to radar gauges allowing for a prevention of interference in the level gauging system as well as a method for such prevention.

2. Description of the Related Art

Radar level gauges are commonly used today for measuring the level of the surface of a product kept in a container, such as a tank. Two different types of radars are principally used in such level gauging, pulse radar gauges and Frequency Modulated Continous Wave (FMCW) radar gauges. The pulse radar uses the pulse-shaped amplitude modulation of the wave to be radiated and determines the direct time interval between transmission and reception of the pulses. The FMCW radar determines the transit time in an indirect way by emitting a frequency-modulated signal and differentiating between the emitted and the received instantaneous frequency.

In certain applications, such as the process industry, there are a need for installing more than one radar gauge, e.g. for redundancy purpose and/or using one radar gauge for level control and another for measuring. The presence of two or more radar gauges in the same container will lead to a certain interference between these gauges. This problem is negligible for an FMCW radar gauge type, but is serious for a pulse radar gauge type. This is due to the fact that an FMCW radar only listens within an interval of about 100 kHz, while a pulse radar is open to the whole frequency band. A pulse radar transmits short pulses in the size of nanoseconds (ns) modulated around one frequency, e.g. 6.3 or 26 GHz, while an FMCW radar is scanning the frequency within a defined frequency band, e.g. 9.5–10.5 GHz.

In the case when more than one pulse radar level gauge is installed in a container, the pulses from one radar level gauge will interfere with the measuring of the other radar level gauge(s) and vice versa, unless the radar level gauges transmitting pulses, transmit these pulses in a synchronized manner or by other means separated.

Therefore, it would be desirable to provide a method and an arrangement for preventing interference between radar level gauges installed in a container for measuring the filling level of a product kept in the container. A method and arrangement which are possible to apply to already existing radar level gauges.

SUMMARY OF THE INVENTION

Accordingly, it is an object of the present invention to provide a method for preventing interference in a radar level gauging system comprising at least two radar level gauges arranged to measure a filling level of a product kept in a container.

This object is achieved through a method in which microwave pulses are transmitted towards the surface of said product and microwave pulses reflected by said surface are received by said at least two radar level gauges, wherein information is provided with said microwave pulses and said information is used for controlling the measurement pulses of said at least two radar level gauges.

Another object of the invention is to provide an improved arrangement in a radar level gauge allowing for a prevention of interference in a radar level gauging system for measure a filling level of a product kept in a container.

This object is achieved through providing a transmitter arranged to transmit microwave pulses towards a surface of said product, a receiver arranged to receive said microwave pulses reflected by said surface, measurement circuitry coupled to the transmitter and receiver for determining the filling level of said product based upon the received microwave pulses, and communication means arranged to provide information with said microwave pulses and to transmit said information to one or more other radar level gauge(s) and to receive information from one or more other radar level gauge(s).

Still another object of the present invention is to provide an improved radar level gauging system for preventing interference comprising at least two radar level gauges arranged to measure a filling level of a product kept in a container.

This object has been achieved through providing at least one of said at least two radar level gauges with a transmitter arranged to transmit microwave pulses towards a surface of said product, a receiver arranged to receive said microwave pulses reflected by said surface, measurement circuitry coupled to the transmitter and receiver for determining the filling level of said product based upon the received microwave pulses, and communication means arranged to provide information with said microwave pulses and to transmit said information to one or more other radar level gauge(s) and to receive information from one or more other radar level gauge(s).

A method and an arrangement in a radar level gauge for preventing interference in a radar level gauging system comprising at least two radar level gauges has been invented, where the measuring with said at least two radar level gauges can be synchronized or by other means separated due to a communication between the radar level gauges present in the container.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
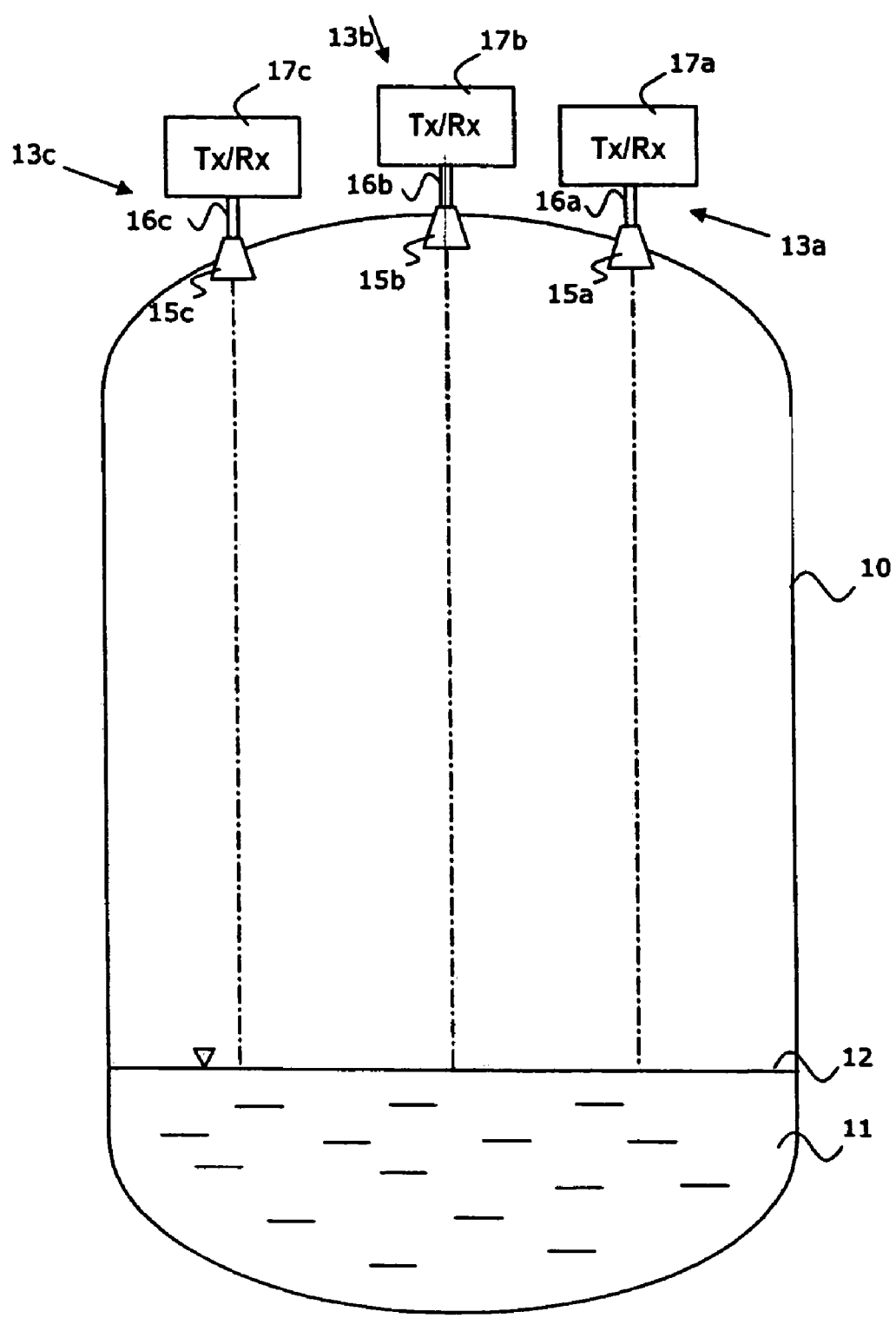
FIG. 1 is a schematic representation of a container in which three pulse radar level gauges are installed according to one embodiment of the present invention.

Referring to FIG. 1, a container indicated generally at 10 is filled with a product 11, the height or level of which is to be determined utilizing a pulse radar level gauge, which measures the distance to a surface 12 of the product 11. In the embodiment shown in FIG. 1, three pulse radar level gauges 13a, 13b, 13c are installed and used for measuring the filling level of the product 11. There may, however, be any number of pulse radar level gauges installed suitable for different applications. The container 10 may e.g. be a tank on a ship, in a process industry or in an oil refinery or may be a dam or pond. The product may be a liquid such as oil or water, a gas, pulverized solid material such as sand or stone powder or other chemical compounds. The pulse radar level gauges 13a, 13b, 13c are mounted on a container port at the top of the container 10 and is sealed relative thereto. The pulse radar level gauges 13a, 13b, 13c each comprise a horn antenna 15a, 15b, 15c which transmits microwaves towards the product surface 12 and receives reflected microwaves from the product surface 12 to provide an indication of the level of the product 11 kept in the container 10. It should be noted that antennas other than horn antennas may of course be used, such as paraboloidal antennas or rod antennas. As a remark, the pulse radar level gauges 13a, 13b, 13c measure the distance from the top to the surface 12 of the product 11, but as the container height is known it is straightforward to recalculate this distance to the level which is the height of the product 11.

Each of the radar level gauges 13a, 13b, 13c further comprises a waveguide 16a, 16b, 16c feeding microwaves between the horn antenna 15a, 15b, 15c and an electronic unit 17a, 17b, 17c in which the microwaves are generated and in which received microwaves are converted into electrical signals. The electronic unit 17a, 17b, 17c used for transmitting microwaves on a transmitting channel, $T_x$, and receiving the reflected microwaves on a receiving channel, $R_x$, is well known and is shown only schematically. The electronic units 17a, 17b, 17c further comprise communication interfaces (not shown) to be able to send and receive information, e.g. send the received microwave signals to a signal-processing unit.

The radar level gauge used in the preferred embodiment of the present invention is a pulse radar level gauge transmitting short carrier wave pulses, e.g. 1 nanosecond (ns), having in the preferred embodiment a 2 MHz Pulse Repetition Frequency (PRF). The PRF is normally a predetermined value stored in the hardware of the pulse radar level gauge. If the level gauging system comprises more than one pulse radar level gauge transmitting on the same frequency, e.g. 6 GHz, these gauges will interfere with each other. A PRF of 2 MHz will give a 0.5 $\mu$s time gap between the transmitted pulses. In a large container, e.g. having a height of about 40 m, the time for a pulse to travel up and down the container will be 0.2 $\mu$s. This means that the gauges are sensitive to interference 40% of the time gap between two transmitted pulses.

The pulse radar level gauge of the present invention "listens" on the receiving channel, $R_x$, to detect other pulse radar level gauges within the container, i.e. to detect pulses from other pulse radar level gauges. For example, in a stand alone mode the radar level gauges transmit pulses during 2 seconds and "listens" for 0.1 second, which provides 5%. Thus, the risk of not detecting other radar level gauges is small. If there are more than one pulse radar level gauge present in the container, these gauges are arranged to communicate through coded information in the transmitted pulses and to use this coded information, for example, to control the timing of the measurement pulses of the radar level gauges (to synchronize the measuring). Thus, each radar level gauge is provided with two communication interfaces, one interface outside the container in the electronic unit and the other interface within the container via the transmitted and received radar pulses. The coding is stored in storage means, such as a memory, of the pulse radar level gauges, i.e. in the software. Therefore, it is possible to apply the inventive method on already existing pulse radar level gauges. Each pulse radar level gauge has a unique unit-ID number, which may be used to identify the different pulse radar level gauges.

The coded information may, as described above, control the timing of the measurement pulses of the radar level gauges, i.e. controlling the radar level gauges to measure in different timeframes. However, besides controlling the timing of the radar level gauges, the information may be used to control the PRF of the different radar level gauges, which normally is stored in the hardware of the radar level gauges, but could be used to prevent interference by letting the different radar level gauges have different PRF. Another use of the coded information to prevent interference, is to control the polarization of the transmitted microwave pulses. And, if dual band radar level gauges are used, i.e. radar level gauges having two versions of the electronics available (such as 6 and 26 GHz) for use in different situations, the coded information may be used to control the frequencies with which the different radar level gauges are measuring the filling level of the product.

The coded information may also be used to increase security of the measurements. By sending the latest measurement result in the information, the radar level gauge next in turn can compare the sent measurement result with the new measurement result etc., and if there is a divergence (more than a predetermined value) the radar level gauge sends an alarm to the operator of the level gauging system. Other parameters than the latest measurement result may be sent, such as the signal strength etc.

The coded information may be provided by making packets of the transmitted pulses and changing the length of the packet on the PRF sequence. Different kind of information will have different lengths of packets. Just as an example, a packet having 100 pulses (will take 50 $\mu$s) means a logical 1 and a packet having 300 pulses (will take 150 $\mu$s) means a logical 0 and that the time gap between two packets is 250 $\mu$s.

Figure 2:
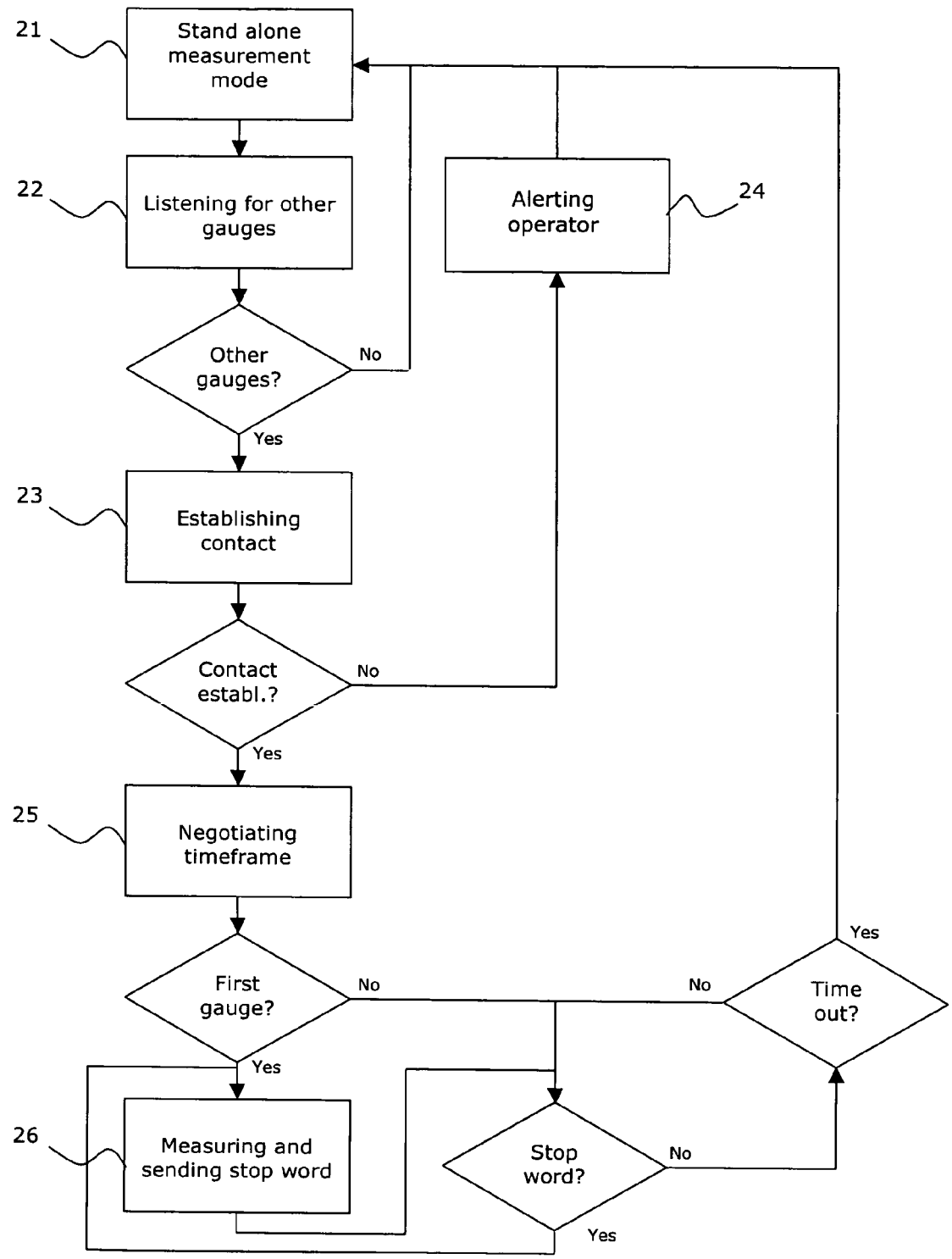
FIG. 2 is a flowchart showing the inventive method steps for preventing interference between two or more pulse radar gauges in a level gauging system.

In the preferred embodiment of the present invention, the procedure for preventing interference between two or more pulse radar level gauges in the level gauging system, shown in FIG. 2, is as follows:

1. The first radar level gauge 13a measures the level of the fluid surface 12 (step 21) by transmitting microwaves towards and receiving reflected microwaves from the fluid surface 12 in a stand alone measurement mode;

2. The radar level gauge 13a listens repeatedly with a predetermined interval on the receiving channel to detect other pulse radar gauges present in the container 10 (step 22) transmitting pulses with the same frequency. If no other radar level gauges are detected the radar level gauge 13a continues to measure the fluid level in the stand alone measurement mode (step 21);

3. If, however, a second 13b and/or a third radar level gauge 13c is/are detected, the first radar level gauge 13a attempts to establish a contact with the other gauge(s) (step 23). Hereby the first radar level gauge 13a transmits coded information, i.e. coded packets of pulses, repeatedly to make sure that the other gauge(s) will be able to detect this information in a listening mode;

4. If contact can't be established, the first radar gauge 13a sends an alarm to the operator (step 24), saying that there are several gauges measuring and that the measurement results may be wrong. Thereafter, the first radar gauge 13a continues to measure the fluid level in the stand alone measurement mode (step 21) and attempts to establish contact again at the next "listening session" (after two more seconds);

5. If contact has been established, i.e. the other gauge(s) 13b, 13c has/have sent an acknowledgement in return, the radar level gauges 13a, 13b, 13c communicate with each other about which timeframes to use (step 25), i.e. determine in which order the gauges 13a, 13b, 13c are to measure and defining a first radar gauge 13a, a second radar gauge 13b and a third radar gauge 13c. For example, the radar level gauges may determine the order based on their unique unit-ID numbers. The radar level gauge having the lowest unit-ID number starts measuring etc. Several known protocols may be used for this negotiation or communication. The radar level gauges can, for example, send a stop word when the measuring is done, telling which radar level gauge it is and that it is done measuring, especially in the case of more than two radar level gauges present. Then the next radar level gauge in turn will know that it can start measuring, and so on;

6. The defined first radar gauge 13a starts measuring the fluid level and sends a message to the defined second radar gauge 13b when the measuring is done (step 26) and so on. Said message is in the preferred embodiment the above described stop word. There is a predetermined time limit for how long the radar level gauges are waiting for the message before they start measuring in the stand alone mode again (step 21).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for preventing interference in a radar level gauging system comprising at least two radar level gauges arranged to measure a filling level of a product kept in a container, the method comprising the steps of:
    transmitting microwave pulses towards a surface of said product;
    receiving said microwave pulses reflected from said surface;
    determining the filling level of said product based upon said received microwave pulses;
    modulating said microwave pulses to carry information with said microwave pulses; and
    communicating using said information for controlling the measurement pulses of said at least two radar level gauges.

2. A method according to claim 1, wherein said information is provided by making packets of said microwave pulses, whereby the packets have different lengths for different information.

3. A method according to claim 1, wherein said information is used for controlling the timing of the measurement pulses of said at least two radar level gauges.

4. A method according to claim 3, wherein the method further comprises the steps of:
    detecting any pulses from at least one other radar level gauge present in the container;
    if pulses from one or more other radar level gauge(s) are detected, attempting to establish contact with said one or more other radar level gauge(s) by transmitting said information and listening for an acknowledgement from said one or more other radar level gauge(s);
    if contact is established, determining in which order said at least two radar level gauges are to measure by defining at least a first and a second radar level gauge.

5. A method according to claim 4, further comprising the step of providing an alert signal indicating that at least one other radar level gauge is detected but no communication is established to thereby prevent interference.

6. A method according to claim 4, wherein the step of detecting is repeated with a predetermined time interval.

7. A method according to claim 4, further comprising the steps of:
    measuring the filling level of said product using the defined first radar level gauge;
    sending a message with said information to the defined second radar level gauge when the measuring using said first radar level gauge is done;
    measuring the filling level of said product using said second radar level gauge;
    sending a message with said information to said first radar level gauge when the measuring using said second radar level gauge is done.

8. A method according to claim 7, wherein said first radar level gauge is waiting for said message from said second radar level gauge during a predetermined period of time and if no message is received within that time period said first radar level gauge starts measuring in a stand alone mode.

9. A method according to claim 7, wherein said message is a stop word.

10. A method according to claim 1, wherein said information is used for controlling the pulse repetition frequency of the measurement pulses of said at least two radar level gauges.

11. A method according to claim 1, wherein said information is used for controlling the polarization of the measurement pulses of said at least two radar level gauges.

12. A method according to claim 1, wherein said information is used for controlling the frequency bands with which said at least two radar level gauges transmit and receive microwaves.

13. An arrangement in a radar level gauge for measuring a filing level of a product kept in a container, wherein said arrangement comprises:
    a transmitted arranged to transmit microwave pulses towards a surface of said product;
    a receiver arranged to receive said microwave pulses reflected by said surface;
    measurement circuitry coupled to the transmitter and receiver for determining the filling level of said product based upon the received microwave pulses;
    communication means arranged to modulate information with said microwave pulses and to transmit said information to at least one other radar level gauge and to receive information from the at least one other radar level gauge.

14. An arrangement according to claim 13, wherein said communication means is arranged to make packets of said microwave pulses having different lengths for different information.

15. An arrangement according to claim 13, further comprising storage means arranged to store said information.

16. An arrangement according to claim 13, wherein said communication means is arranged to detect any pulses from the at least one other radar level gauge present in the container, and to attempt to establish contact with said one or more other radar level gauge(s).

17. An arrangement according to claim 16, further comprising alerting means arranged to provide an alert signal indicating that the at least one other radar gauge is detected but no communication is established to thereby prevent interference.

18. An arrangement according to claim 13, wherein said information is used to prevent interference between said radar level gauge and at least one other radar level gauge present in said container by controlling the timing of the measurement pulses from said radar level gauge and one or more other radar level gauge.

19. An arrangement according to claim 13, wherein said information is arranged to prevent interference between said radar level gauge and at least one other radar level gauge present in said container by controlling pulse repetition frequency of the measurement pulses from said radar level gauge and one or more other radar level gauge.

20. An arrangement according to claim 13, wherein said information is used to prevent interference between said radar level gauge and at least one other radar level gauge present in said container by controlling a polarization of the measurement pulses from said radar level gauge and one or more other radar level gauge.

21. An arrangement according to claim 13, wherein said radar level gauge is arranged to measure the filling level of said product by using at least two different frequency bands and said information is arranged to prevent interference between said radar level gauge and at least one other radar level gauge present in said container by controlling said frequency bands.

22. A level gauging system comprising at least two radar level gauges arranged to measure a filling level of a product kept in a container, wherein at least one of said at least two radar level gauges comprises:
- a transmitter arranged to transmit microwave pulses towards a surface of said product;
- a receiver arranged to receive said microwave pulses reflected by said surface;
- measurement circuitry coupled to the transmitter and receiver for determining the filling level of said product based upon the received microwave pulses;
- communication means for modulating information with said microwave pulses and for transmitting said information to at least one other radar level gauge and for receiving information from the at least one other radar level gauge.

* * * * *